(12) United States Patent
Wirsching

(10) Patent No.: US 6,355,374 B1
(45) Date of Patent: Mar. 12, 2002

(54) ARRANGEMENT IN AN ELECTRIC APPARATUS

(75) Inventor: Sven Wirsching, Høvik (NO)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/339,955

(22) Filed: Jun. 25, 1999

(30) Foreign Application Priority Data

Jul. 3, 1998 (NO) .............................. 19983092

(51) Int. Cl.[7] .................................. H01M 2/10
(52) U.S. Cl. ..................... 429/96; 429/97; 429/99; 429/100
(58) Field of Search ................. 429/96, 97, 99, 429/100

(56) References Cited

U.S. PATENT DOCUMENTS

| | | | |
|---|---|---|---|
| 4,184,008 A | | 1/1980 | Watakabe |
| 4,782,432 A | * | 11/1988 | Coffman ..................... 362/184 |
| 5,210,525 A | * | 5/1993 | Lennon et al. .............. 340/604 |
| 5,369,796 A | | 11/1994 | Kung |
| 5,526,526 A | | 6/1996 | Clark et al. |
| 5,625,688 A | | 4/1997 | Ford et al. |
| 5,665,485 A | * | 9/1997 | Kuwayama et al. ........ 429/100 |
| 5,681,110 A | * | 10/1997 | Burzacchi ................... 374/156 |
| 5,704,803 A | * | 1/1998 | Oshima et al. ............. 439/500 |
| 5,707,757 A | * | 1/1998 | Lee .............................. 429/86 |
| 6,108,962 A | * | 8/2000 | Barron ...................... 43/42.31 |

FOREIGN PATENT DOCUMENTS

DE 197 11 278 9/1998

* cited by examiner

*Primary Examiner*—Carol Chaney
*Assistant Examiner*—Tracy Dove
(74) *Attorney, Agent, or Firm*—Nixon & Vanderhye PC

(57) ABSTRACT

The present invention relates to an arrangement in a portable device, in particular a mobile telephone powered by batteries, and for the purpose of keeping the mobile telephone floating if it falls into water, it is according to the present invention suggested that the phone comprises a detachably affixed battery pack comprising buoyancy means, for example, a waterproof space or cavity giving buoyancy when the phone with battery housing is in water.

9 Claims, 3 Drawing Sheets

ARRANGEMENT IN AN ELECTRIC APPARATUS

FIELD OF THE INVENTION

The present invention relates to an arrangement in an electric apparatus, especially a portable apparatus which is driven by means of batteries.

BACKGROUND OF THE INVENTION

The mobile phones are often used at or nearby the sea. Often the mobile phone is carried in the shirt pocket or held in the hand, so that there is a high risk of the mobile phone falling into the water. It would therefore be useful if the mobile phone could float, and was waterproof.

STATE OF THE ART

Plastic bags are sold for enclosing mobile phones, but these bags are not very elegant, and the sound quality is bad. Thus, the only advantage of plastic bags is that they are waterproof.

JP-6 135 375-A relates to a rescue float transmitting self-position information, which provides for quick rescue of victim by detecting bearings using transmitter antenna.

OBJECTS OF THE INVENTION

The main object of the present invention is to provide a solution to the problem of keeping an apparatus, for example a portable device for transmitting and receiving signals such as a mobile phone, floating if it falls into water.

Another object of the present invention is to provide this solution by means of very simple expediences.

Still another object of the present invention is to provide this solution without changing the overall design of the apparatus or the mobile phone to any substantial degree.

BRIEF DISCLOSURE OF THE INVENTION

According to the invention, a floating device can be provided by designing a new battery housing, with greater volume than the original battery housing provided by the device manufacturer, and adding a float substance into it. Using such a battery pack or housing has several advantages. First, it is possible to keep the overall industrial design of the device almost unchanged. This is possible because very little extra volume is needed to give enough buoyancy to keep the apparatus floating. Instead of adding volume, it is also possible in accordance with the invention to reduce weight by using smaller battery cells, and by this achieve reduced overall device weight, while still keeping the volume and industrial design as is.

A second advantage of this invention is the use of the device manufacturer's fix and release mechanism for the battery pack or battery housing. By using this already existing mechanism, the customer will find it convenient to change between the standard battery pack/battery housing provided originally by the manufacturer, and the battery pack/battery housing of the invention, which has greater buoyancy.

Further features and advantages of the present invention will appear from the following description taken in conjunction with the enclosed drawings.

BRIEF DISCLOSURE OF THE DRAWINGS

DETAILED DESCRIPTION OF EMBODIMENTS

The general solution presented by the present invention may find its application in any electric apparatus. However, in the following the invention will be discussed specifically in connection with how to design a mobile telephone battery pack with enough buoyancy/lift to carry both the battery pack and the mobile telephone.

Figure 1:
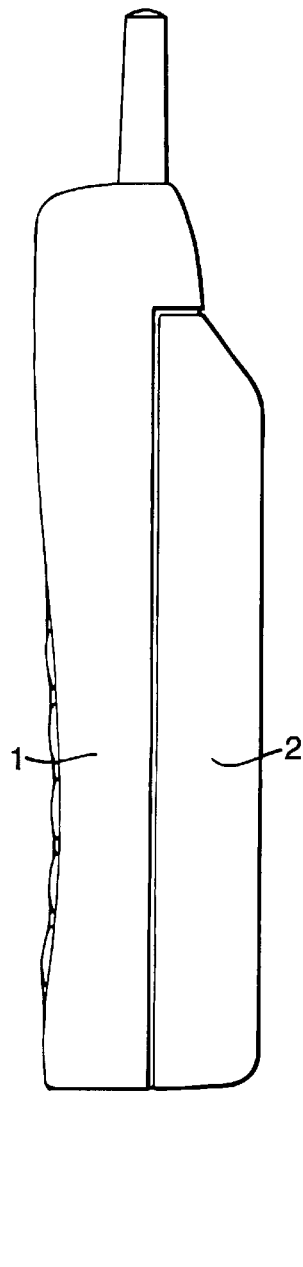
FIG. 1 is a side view of a mobile telephone, for example Ericsson type GH688, including a waterproof battery pack of standard size, comprising battery cells which are lighter than usual, and/or small enough to give a waterproof cavity giving buoyancy when the mobile telephone with battery pack is in water.

In FIG. 1 there is illustrated a side view of an Ericsson mobile phone GH688. In the drawing the mobile telephone is designated by reference numeral 1, whereas a standard battery pack is designated by reference numeral 2. It is to be understood that the battery pack comprises a battery housing and any number of battery cells stored therein.

Only small modifications on existing battery packs or battery housings types are necessary. Tests have been made with such a mobile telephone wherein a standard high capacity battery housing with standard light weight battery cells are used instead of the high capacity battery cells, making the assembled unit almost floating.

This solution is unique because the user only needs for example another suitable battery housing or an extra battery pack comprising a waterproof cavity giving buoyancy for the assembled unit, i.e. making the whole telephone floatable. It is a simple solution, both elegant and price favorable. When not being in an environment requiring buoyancy, the user may switch back to said first battery pack.

By utilizing the existing mechanism and design of a common battery pack provided by the device vendor, and by sealing the same, there may be provided a floating telephone set by just replacing the normal battery cells with cells of less weight and/or by removing enough battery cells from the battery pack itself and the whole telephone is made floating.

It is to be understood that batteries of less weight may involve batteries having included therein a space or cavity contributing to the buoyancy in question.

It is also to be understood that the battery housing itself may also be made of a material having a density less than 1 kg/dm$^3$.

Figure 2:
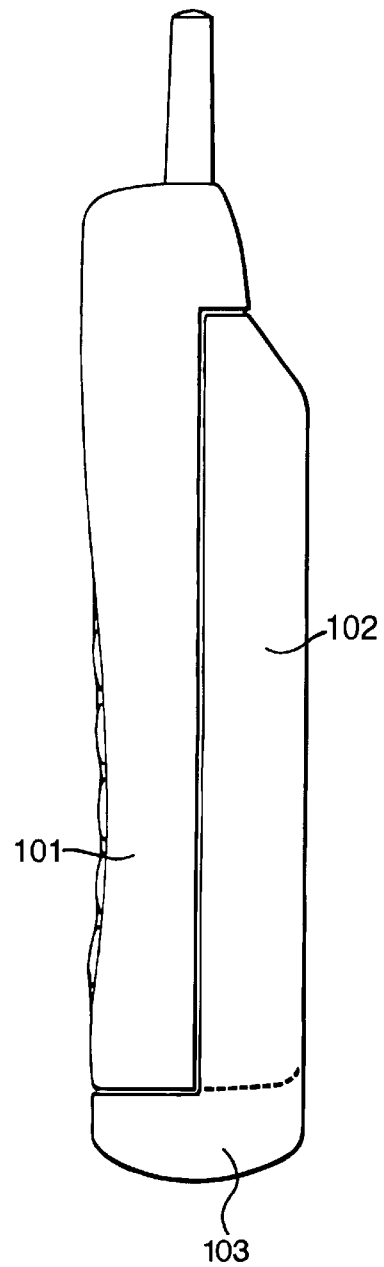
FIG. 2 is a side view of a mobile telephone, for example Ericsson type GH688, including a modified battery pack, wherein the lower part thereof may be holding a float substance.

In the embodiment illustrated in FIG. 2 the telephone 101 is also here provided with a standard battery housing 102, which is waterproof, but which possibly may have added extra float substance 103 at the bottom thereof. By having this specific bottom arrangement embracing the lower part of the telephone 101 there will also be achieved a protection of the system contacts, i.e. from the intrusion of water thereto.

Figure 3:
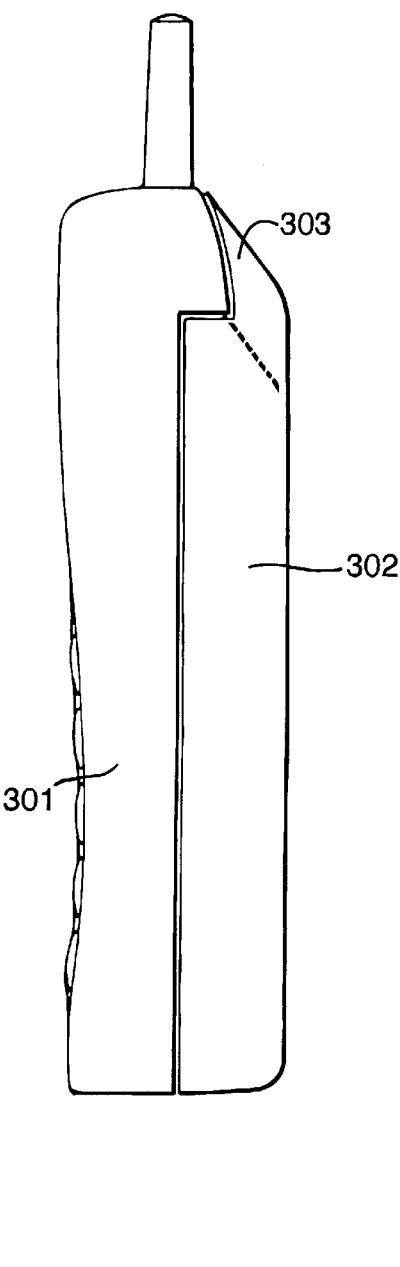
FIG. 3 is a side view of an another type of mobile telephone including a variant of a waterproof battery pack, holding extra float substance at the top thereof.

In FIG. 3 there is illustrated another embodiment of a telephone 301, including a battery housing 302 having extra float substance 303 arranged at the top thereof.

Figure 4:
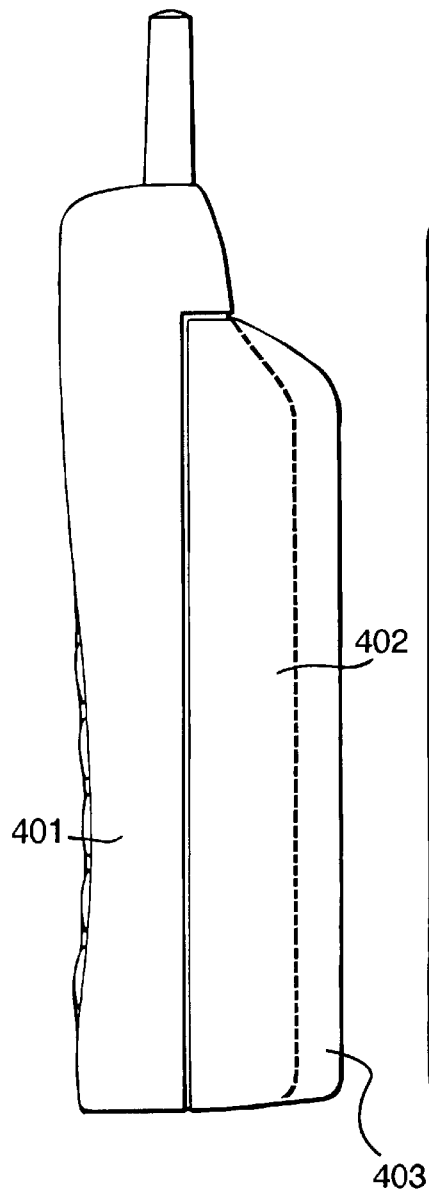
FIG. 4 is a side view of still another type of mobile telephone, including a waterproof battery pack wherein extra float substance is provided along the overall extension of the battery pack.

FIG. 4 is another embodiment of a mobile telephone 401 including another type of waterproof battery housing 402 having a somewhat larger thickness, and having extra float substance 403 arranged along the overall length of the battery housing.

Figure 5:
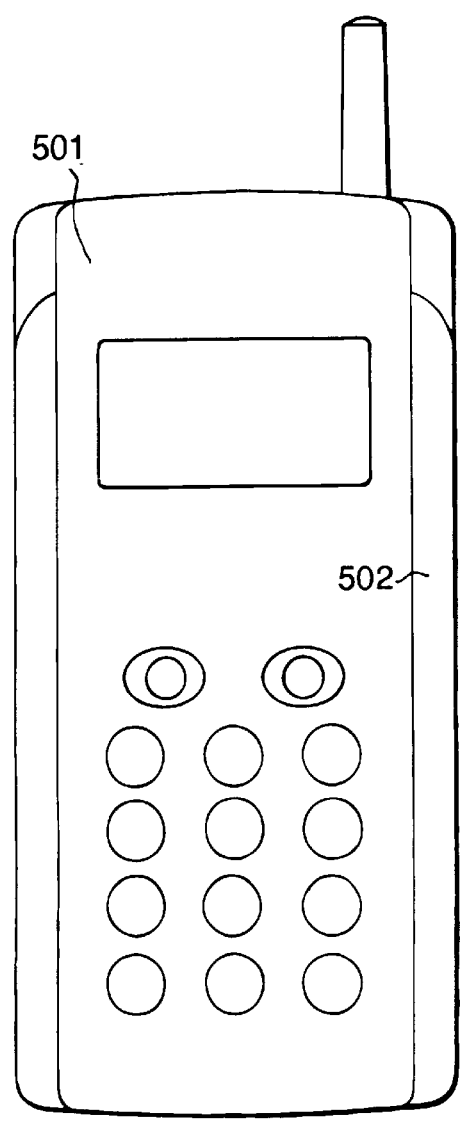
FIGS. 5 and 6 are a front view and a side view, respectively, of another type of mobile telephone, including a waterproof battery pack encircling the telephone on three sides thereof, making the overall width of the telephone a little wider, but with reduced thickness.
Figure 6:
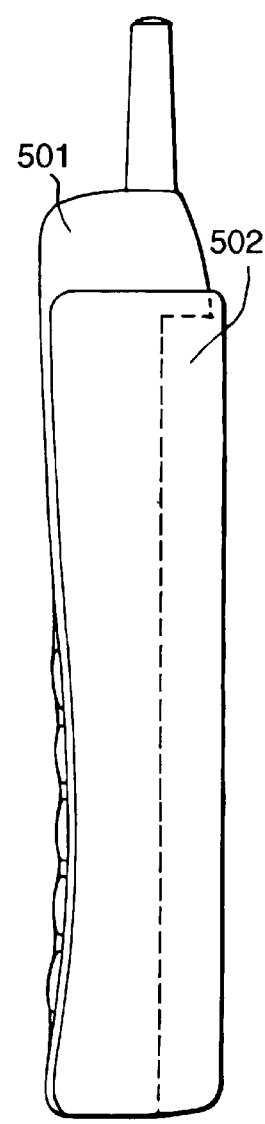

FIG. 5 and FIG. 6 illustrate another embodiment of a mobile telephone 501 including a waterproof battery housing 502 embracing said telephone 501, on three sides thereof. The overall telephone unit will thereby become somewhat broader, but will maintain approximately its standard thickness.

Figure 7:
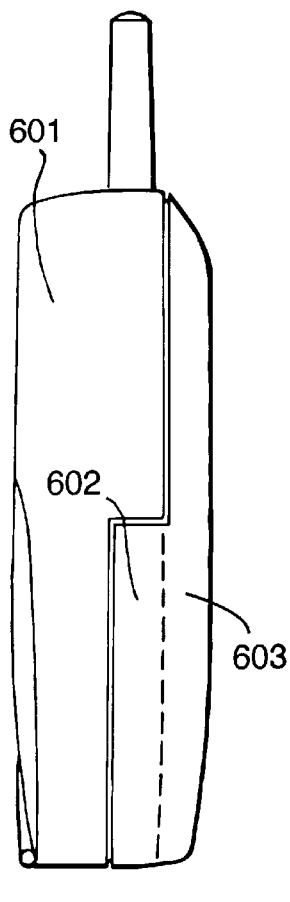
FIG. 7 is still another example of a mobile telephone including a waterproof battery pack wherein extra float substance is added along the overall length of the telephone.

FIG. 7 illustrates another embodiment of a mobile telephone 601, here completed with a battery housing 602 with extra float substance 603 distributed along the overall length of the telephone.

Figure 8:
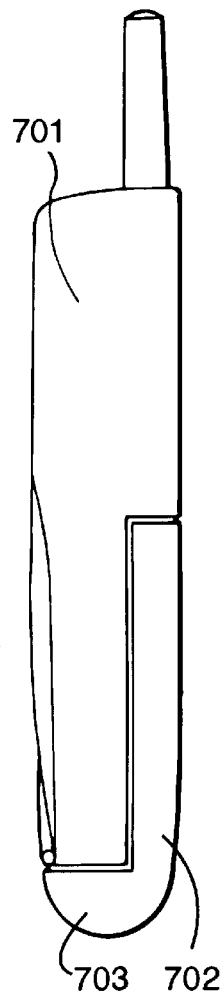
FIG. 8 is a side view of still another embodiment of a mobile telephone, including a waterproof battery pack wherein extra float substance is arranged at the bottom thereof.

FIG. 8 is still another embodiment of a mobile telephone 701 which at the bottom part thereof carries a waterproof battery housing 702 having extra float substance 703 at the bottom thereof, especially a bottom portion embracing the bottom portion of the telephone 701.

Figure 9:
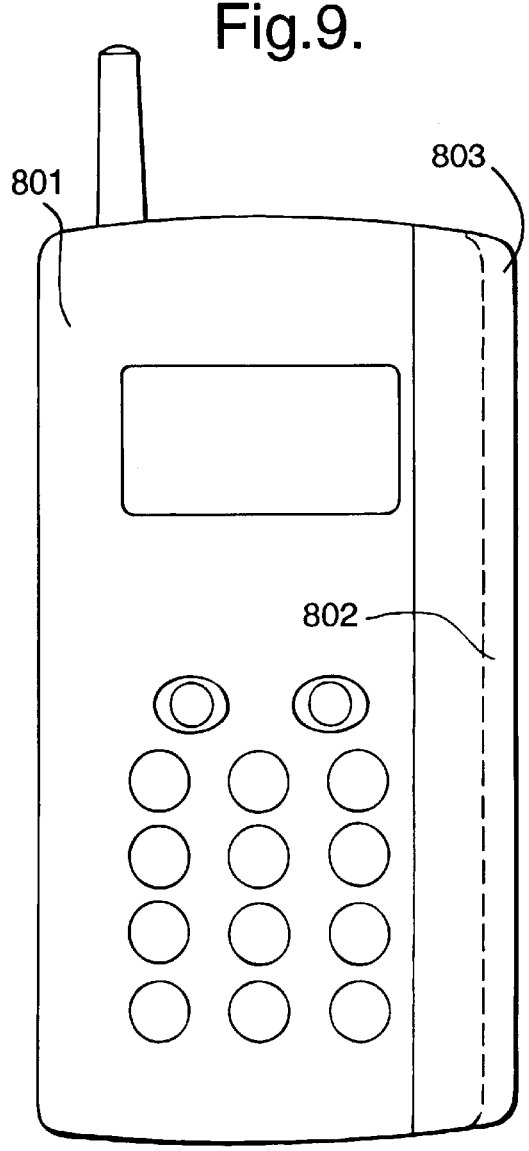
FIG. 9 is a front view of still another type of mobile telephone, including a specifically broad waterproof battery pack, wherein float substance is arranged along the complete length of the telephone.

FIG. 9 is a front view of still another embodiment of a mobile telephone 801 carrying a specifically broad battery housing 802 comprising float substance 803 distributed along the overall length of the telephone.

The battery housing or outer shell of the floating battery pack may preferably be made of the same material as the standard battery pack provided with the device. However, this may differ between the manufacturers, but will typically be a kind of plastic. The material inside that gives the buoyancy might be any material with density less than 1 kg/dm$^3$, i.e. nitrogen gas, simple air, expanded polyester, or other material with closed/sealed cells.

Further, the use of such specifically designed battery housings and/or battery packs and/or specifically designed battery cells may be considered in connection with telephones, or any appropriate electrical device, also comprising such buoyancy means as discussed previously.

What is claimed is:

1. A portable device for transmitting and receiving signals having a first attachment assembly for detachably securing a battery pack thereto, in combination with a buoyant battery pack having a second attachment assembly complementary to said first attachment assembly detachably affixed to said portable device to power said portable device and for giving buoyancy to said portable device when the combination of the device with buoyant battery pack is in water, the battery pack defining a generally contiguous surface with the body of the device, whereby the battery pack and the device define an integrated design.

2. The portable device as claimed in claim 1, wherein said buoyant battery pack comprises battery cells having a watertight, buoyancy space or cavity included therein.

3. The portable device as claimed in claim 2, wherein in the watertight buoyancy space there is provided a float substance, comprising a material having a density of less than 1 kg/dm$^3$ selected from the group consisting of nitrogen gas, air, expanded polyester, and closed cell materials.

4. The portable device as claimed in claim 1, wherein the buoyant battery pack has a housing made of a material having a density less than 1 kg/dm$^3$.

5. The portable device as claimed in claim 1, wherein the buoyant battery pack comprises a housing having a watertight space defined therewithin.

6. The portable device as claimed in claim 1, wherein the buoyant battery pack is attached to a rear part of the device.

7. The portable device as claimed in claim 1, wherein a float substance is added to at least one of a bottom, a rear part, sides, and a top of said buoyant battery pack.

8. A portable device comprising a mobile telephone and a buoyant battery pack detachably secured to said mobile telephone for powering said telephone and for giving buoyancy to said mobile telephone when the combination of the mobile telephone with buoyant battery pack is in water, the buoyant battery pack defining a generally contiguous surface with the body of the device, wherein the buoyant battery pack includes at least one of a watertight buoyancy space defined therewithin and a float substance having a density less than 1 kg/dm$^3$.

9. In a portable device for transmitting and receiving signals, a detachable, buoyant battery pack for powering said portable device and for giving buoyancy to said device when a combination of the device with buoyant battery pack is in water, wherein the buoyant battery pack includes at least one of a watertight buoyancy space defined therewithin, and a float substance having a density less than 1 kg/dm$^3$.

* * * * *